US011654566B2

(12) United States Patent
Miller

(10) Patent No.: US 11,654,566 B2
(45) Date of Patent: May 23, 2023

(54) ROBOTIC ACTIVITY DECOMPOSITION

(71) Applicant: GENERAL ELECTRIC COMPANY, Schenectady, NY (US)

(72) Inventor: Bradford Wayne Miller, Malta, NY (US)

(73) Assignee: General Electric Company, Schenectady, NY (US)

( * ) Notice: Subject to any disclaimer, the term of this patent is extended or adjusted under 35 U.S.C. 154(b) by 338 days.

(21) Appl. No.: 16/991,267

(22) Filed: Aug. 12, 2020

(65) Prior Publication Data

US 2022/0048191 A1 Feb. 17, 2022

(51) Int. Cl.
*B25J 9/16* (2006.01)
*B25J 9/00* (2006.01)

(52) U.S. Cl.
CPC .......... *B25J 9/1671* (2013.01); *B25J 9/0081* (2013.01); *B25J 9/161* (2013.01); *B25J 9/1653* (2013.01); *B25J 9/1676* (2013.01); *B25J 9/1666* (2013.01)

(58) Field of Classification Search
CPC ........ B25J 9/1671; B25J 9/0081; B25J 9/161; B25J 9/1653; B25J 9/1676; B25J 9/1666; B25J 9/163; G06N 3/008; G06N 20/00; G05B 2219/39298; G06F 11/36
USPC ........................................................ 700/245
See application file for complete search history.

(56) References Cited

U.S. PATENT DOCUMENTS

| | | | |
|---|---|---|---|
| 6,560,512 B1 * | 5/2003 | Rosen .................... | B25J 9/1664 |
| | | | 700/262 |
| 9,302,393 B1 * | 4/2016 | Rosen .................... | B25J 9/1694 |
| 9,573,277 B2 | 2/2017 | Rosen et al. | |
| 9,649,765 B2 * | 5/2017 | Frische .................. | B25J 9/1664 |
| 9,811,074 B1 * | 11/2017 | Aichele .................. | B25J 9/1656 |
| 9,931,508 B2 | 4/2018 | Burdick et al. | |
| 10,460,394 B2 | 10/2019 | Perl et al. | |
| 10,838,779 B1 * | 11/2020 | Yue ....................... | G06F 16/168 |
| 2011/0087515 A1 | 4/2011 | Miller et al. | |

(Continued)

FOREIGN PATENT DOCUMENTS

| | | |
|---|---|---|
| CN | 103106556 A | 5/2013 |
| CN | 103530633 A | 1/2014 |

(Continued)

OTHER PUBLICATIONS

Jetchev et al., "Trajectory Prediction in Cluttered Voxel Environments", 2010 IEEE International Conference on Robotics and Automation, USA, pp. 2523-2528, Jul. 15, 2010.

(Continued)

*Primary Examiner* — B M M Hannan
(74) *Attorney, Agent, or Firm* — Buckley, Maschoff & Talwalkar LLC

(57) ABSTRACT

Provided are systems and methods for decomposing learned robotic activities into smaller sub-activities that can be used independently. In one example, a method may include storing simulation data comprising an activity of a robot during a training simulation performed via a robotic simulator, decompose the activity into a plurality of sub-activities that are performed by the robot during the training simulation based on changes in behavior of the robot identified within the simulation data, and generating and storing a plurality of programs for executing the plurality of sub-activities, respectively, in the storage.

20 Claims, 13 Drawing Sheets

(56) References Cited

U.S. PATENT DOCUMENTS

| | | | |
|---|---|---|---|
| 2013/0054021 A1 | 2/2013 | Murai et al. | |
| 2015/0239127 A1* | 8/2015 | Barajas | B25J 9/1671 |
| | | | 700/253 |
| 2016/0096272 A1* | 4/2016 | Smith | G05D 1/0088 |
| | | | 700/255 |
| 2018/0077300 A1* | 3/2018 | Asai | H04N 1/00411 |
| 2018/0293517 A1* | 10/2018 | Browne | G06F 9/4881 |
| 2018/0307603 A1* | 10/2018 | Che | G06F 9/5088 |
| 2019/0009133 A1 | 1/2019 | Mettler May | |
| 2019/0047149 A1* | 2/2019 | Wouhaybi | G06N 3/0454 |
| 2019/0171210 A1 | 6/2019 | Passot et al. | |
| 2019/0187703 A1 | 6/2019 | Millard et al. | |
| 2019/0232489 A1 | 8/2019 | Pascanu et al. | |
| 2019/0235512 A1 | 8/2019 | Sinyavskiy et al. | |
| 2019/0291277 A1* | 9/2019 | Oleynik | B25J 9/1697 |
| 2019/0310632 A1* | 10/2019 | Nakhaei Sarvedani | |
| | | | G06V 10/85 |
| 2020/0171671 A1* | 6/2020 | Huang | B25J 9/161 |
| 2020/0319640 A1* | 10/2020 | Vogel | A47L 9/2842 |
| 2021/0170575 A1* | 6/2021 | Shen | B25J 9/0084 |
| 2021/0299875 A1* | 9/2021 | Iyer | B25J 9/1682 |
| 2021/0325894 A1* | 10/2021 | Faust | G05D 1/0221 |
| 2021/0362330 A1* | 11/2021 | Kolluri | B25J 9/1661 |
| 2021/0402593 A1* | 12/2021 | Wake | G06T 7/20 |
| 2022/0131984 A1* | 4/2022 | Sato | H04N 1/00214 |
| 2022/0197773 A1* | 6/2022 | Butler | H04N 21/234 |

FOREIGN PATENT DOCUMENTS

| | | | | |
|---|---|---|---|---|
| KR | 20100073771 A | * | 7/2010 | B25J 13/08 |
| WO | WO-2014201422 A2 | * | 12/2014 | B25J 9/161 |
| WO | WO-2018176025 A1 | * | 9/2018 | |
| WO | WO-2018236674 A1 | * | 12/2018 | G06F 15/80 |
| WO | WO-2020106706 A1 | * | 5/2020 | B25J 9/1612 |
| WO | WO-2020178435 A1 | * | 9/2020 | B25J 9/1664 |

OTHER PUBLICATIONS

Martin et al., "Long-Term Exploration & Tours for Energy Constrained Robots with Online Proprioceptive fraversability Estimation", 2014 IEEE International Conference on Robotics and Automation (ICRA), China, pp. 5778-5785, Sep. 29, 2014.

Nguyenova et al., "Modelling Proprioceptive Sensing for Locomotion Control of Hexapod Walking Robot in Robotic Simulator", MESAS 2018: Modelling and Simulation for Autonomous Systems, vol. 11472, pp. 215-225, Mar. 14, 2019.

Ersen et al., "Cognition-Enabled Robot Manipulation in Human Environments: Requirements, Recent Work, and Dpen Problems", IEEE Robotics & Automation Magazine, vol. 27, Issue No. 03, pp. 108-122, Sep. 2017.

* cited by examiner

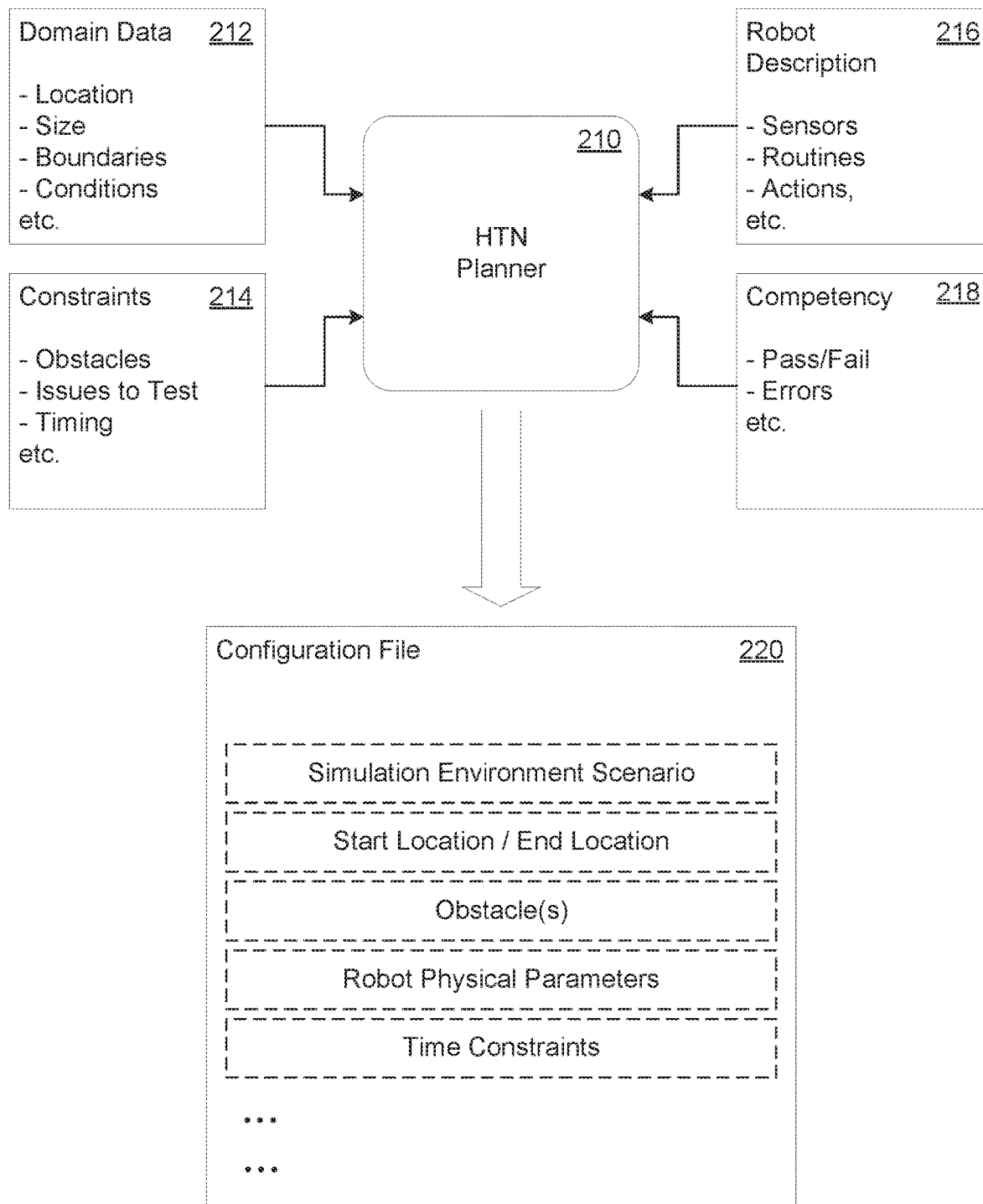

ROBOTIC ACTIVITY DECOMPOSITION

BACKGROUND

A robot (e.g., a field robot, a mobile robot, etc.) is a combination of mechanical and electrical parts. A robot also includes software which can be used to make the robot "intelligent." Robots can be mobile akin to an autonomous vehicle and perform dynamic functionality based on decisions that are made by the robot. As artificial intelligence improves, robots can evolve into a new kind of intelligence that is further capable of intuitively interacting with a physical environment.

Machine learning algorithms are used to train a robot to acquire skills and adapt to its environment. Examples of these skills include sensorimotor skills (e.g., locomotion, grasping, an object, categorization, etc.) as well as interactive skills (e.g., manipulation of an object, linguistics, etc.) Typically, a robot (or the robot's software) is trained within a simulation environment. Once the simulation is successful, the trained algorithm may be integrated into the physical robot. Configuring the simulation is a manual process of art, which requires a human being to generate configuration data that is highly correspondent to the domain in order for the trained model to be effective in controlling the robot. For the robot to be successfully trained, many simulations (e.g., thousands, etc.) may need to be performed. Thus, the machine learning training process can take significant time and effort.

SUMMARY

The example embodiments improve upon the prior art by automatically generating configurations of a robotic simulator for training a machine learning algorithm of a robot. For example, an automatic planner such as a hierarchical task network (HTN) planner, or the like, may receive domain information about the robot's operating environment, user concerns/criteria to be tested, and the like, and generate configuration files for the robotic simulator. That is, rather than rely on a human to manually configure the configuration files for the robotic simulator, the system described herein can automatically generate such configuration files based on the environment of the robot and any concerns to be tested. The planner may customize the configuration files to guarantee coverage of distinct issues (e.g., safety, reliability, etc.) within a particular domain. Rather than generating randomized tests/tracks, the planner may configure simulations to ensure that a particular issue is tested for a predetermined amount of the time or with a predetermined number of variations. Furthermore, the planner may create simulations that are for generalized training as well.

The example embodiments further improve upon the prior art by decomposing an activity performed/learned by the robot into a plurality of sub-activities. The activity (which may be internal and/or external) may include proprioceptive activities which the robot performs in memory and/or physical actions taken by the robot externally. The system herein may generate a log or a trace of actions performed by a robot simulation during a training activity, and detect various sub-activities based on actions taken by the robot during the training activity. For example, changes in speed, changes in process, changes in direction, different memory actions, and the like, may be used to identify the sub-activities. A training activity may be specific to one particular situation such as getting around an obstacle within a room. But if the training activity is broken into smaller sequential parts such as entering a room, arriving at the obstacle, travelling around the obstacle, travelling out of the room, etc. the sub-activities may be applied to other non-identical situations.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating a process of generating a configuration file for configuring a robotic simulator in accordance with an example embodiment.

Figure 1:
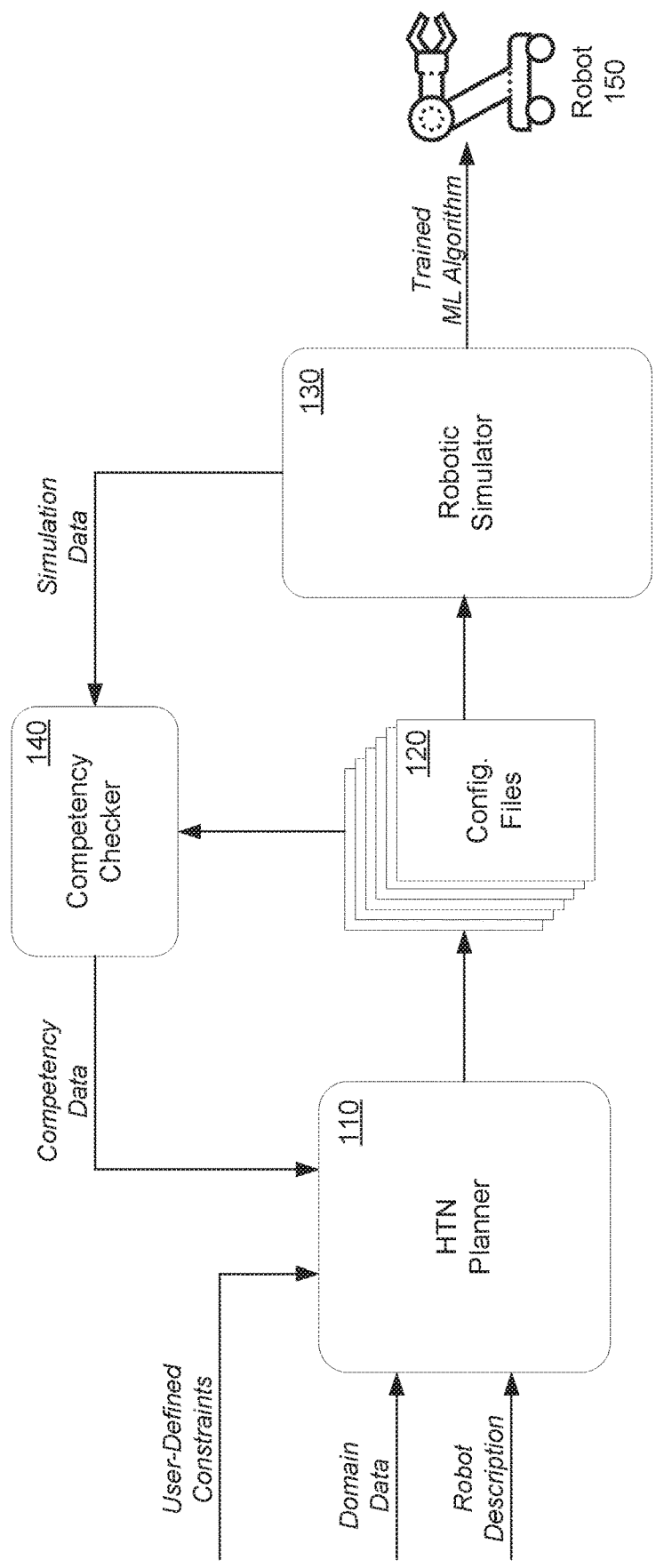
FIG. 1 is a diagram illustrating a simulation environment for robot training in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Several methods for training robots have evolved over the years. In one example, an automated planner such as a hierarchical task network (HTN), and the like, can be used to cut down on a planning search space in comparison to classical planning. The planner can choose lower-level actions for training a robot and organize them hierarchically to create a more complex learning action. For example, the planner may decompose an action such as fetching an object into multiple sub-actions such as travel to the object, pickup the object, bring the object back to a point, etc. The robot may be implemented with choices. Here, the robot may be given a task and may use a plurality of sub-tasks to achieve the larger task.

Meanwhile, machine learning can be used to train a robot to adapt to its environment through learning algorithms. For example, a robot may have installed therein a machine learning algorithm which can be trained through the use of a simulator (robotic simulator). Here, the robotic simulator may create a particular environment for the robot and the robot may randomly attempt things for a given situation. Over time the machine learning algorithm being implemented by the robot learns, through many attempts (e.g., many simulations), a successful policy for the given situation. For example, through a training process, a machine learning algorithm may be able to detect whether an object is the color red by showing the robot many different objects where some objects are red in color and some are not In this example, in supervised learning, these different situations may be clearly labeled to increase the speed at which the learning may occur, while in unsupervised learning the situations are not labeled and the robot must infer that the difference in color is important typically through a reinforcement signal. In this case, the robot/ML algorithm learns how to identify whether an object is red in color or not, and can do so in the real world.

Machine learning may be constrained to only allow the robot to do one thing (i.e., carry out one task). Such learning may be used to reason about a particular task in a way that can be applied to multiple problems, possibly abstracted away from the original learning environment. For example, a policy for "driving a car" may be very general, but would also be difficult to reason about how the car would be handled in any particular circumstance, particularly if it is not clear exactly what situations the model was trained in, as well as requiring extensive testing. Alternatively, a policy for "turning a car right at a four-way stop sign intersection" is much more constrained and thus more amenable to generating learning scenarios, testing the resultant policy, and understanding the circumstances under which it could be used. The result is a policy for that particular task which is programmed into the robot in advance and which the robot can use when the robot encounters the appropriate situation in the real world.

The example embodiments combine the use of an automated planner (e.g., an HTN planner, etc.) with the machine learning simulation process. For example, the system can extend the use of the planner to generate hierarchical configuration files for configuring a simulation environment of the robotic simulator. The planner can automatically create the content of the configuration files based on domain information of the robot, user concerns/specifications to be tested, feedback from the simulations, and the like. As a result, the robot (e.g., the ML algorithm of the robot) can learn tasks in a hierarchical manner instead of as a single policy. Thus, the robot can be better equipped to identify the salient situation and determine the most specific policy to apply in that situation, where situations can be ranked hierarchically in terms of their specificity, e.g., room, empty room, empty room with lights on, room with obstacle, etc.

The automatic planner may have symbolic models that allow the robot to reason about situations using models in a way that is understandable by humans, allow task abstraction/decomposition as well as advice about how to decompose a task based on situational features. HTN is one such class of planner but there may be others that would be appropriate as well.

According to various embodiments, the configuration files generated by the planner can program the simulator to perform an internal simulation (i.e., a "proprioceptive" simulation) of the robot based on an abstract model of things that are known (or postulated) but possibly unseen rather than an "exteroceptive" simulation where the robot extracts physical features from the simulated environment. In the exteroceptive case, the robot essentially runs inside the simulator (and thus must perceive the simulated environment which runs independently of the robot's processor), while in the proprioceptive case, the simulator acts as a kind of "imagination" that lets the robot control the simulator to explore possibilities as a method for deciding on the action to take based on multiple possible situations rather than just the one presented by the exteroceptive simulator. Thus, the planner can create configuration files for teaching a robot how to think through possible situations compatible with what has been sensed, and not just react to physical environment features that are sensed.

The configuration files may be used by the robotic simulator in a sequence. In some embodiments, each configuration file in the sequence may increase a difficulty of the simulation environment in a hierarchical manner, however, embodiments are not limited thereto. For example, each configuration file in the sequence may include a common task for the robot to perform with more difficulty added to the task. In this case, the goal may be the same in each simulation (e.g., fetch an object, traverse from a start point to an end point, etc.), while the issues (e.g., obstacles, constraints, etc.) may make achieving the goal more complex. In this way, the robot can learn a range of policies over the feature set of an environment, rather than a single policy. In some embodiments, the HTN planner may include a special library of scenarios to use to test the robot. The HTN planner may access the library when creating the configuration files, read data therefrom, and add the data to the configuration files.

FIG. 1 illustrates a simulation environment 100 for robot training in accordance with an example embodiment. Referring to FIG. 1, the simulation environment 100 may include an HTN planner 110 which creates configuration files 120 for a simulation application 130 (i.e., a robotic simulator) which can be used to train a machine learning algorithm that can be integrated into a physical robot 150. The simulation application 130 may create a virtual world where the machine learning algorithm can be trained based on a virtual representation of the robot. When the simulated algorithm reaches a desired level of accuracy and performance, the machine learning algorithm may be transferred to the robot 150.

The simulation application 130 (e.g., robotic simulator) may create an application for the physical robot 150 without depending on the actual machine. The simulation application 130 may include a behavior-based simulator that creates a simulation environment of rigid objects and light sources, and programs the robot to interact with the simulation environment. Behavior-based simulation allows for actions that are more biological in nature. The simulation application 130 may include a physics engine for a more realistic motion generation of the robot 150 in the simulation environment. The simulation application 130 allows the training to be performed off-line in a simulated environment where the final tested/debugged version may then be added to the robot 150.

According to various embodiments, the HTN planner 110 may decompose a training task for the robot into a plurality of sub-tasks or sub-steps where each step is used to further the learning by the robot. The sub-tasks may be implemented within the plurality of configuration files 120. Each simulation that is performed by the simulation application 130 may include a simulation environment that is designed based on a configuration file 120. Each configuration file 120 may include a different configuration of the simulation environment for the robot to interact with.

The HTN planner 110 may receive various inputs which the HTN planner 110 uses to create the configuration files 120. For example, the HTN planner 110 may receive a domain description of the simulation environment (e.g., a plant floor, a tunnel, a bridge, a building, etc.). The domain description may include parameters of the environment such as dimensions of the simulation environment (e.g., dimensions of a room, a field, a machine being operated on by the robot, an underwater environment, etc.) The domain description may also include additional objects/items within the simulation environment. As an example, the domain description may be added through a user interface of the HTN planner 110. As another example, the domain description may be uploaded in a separate file (e.g., WL, document, etc.).

In some embodiments, the HTN planner 110 may receive a description of the robot 150, for example, the sensors, routines the robot knows (perception functions, etc.), actions it can take, etc. Domain data should include everything needed to represent goals in the domain. For example, if a goal is to get the robot to a blue tower, then the domain data may include a representation of blue as a feature or attribute of things, towers as something to be perceived, etc. Meanwhile, the robot data may include an identifier of a robot model as to what perception algorithm to run to know that there is a tower, the tower is blue, where the tower is, and the like.

In addition to the domain description, the HTN planner 110 may also receive user-defined constraints. The user-defined constraints may include specific issues that the robot is to be tested for. For example, the user-defined constraints may include safety requirements such as operational hazards that the robot is to identify and avoid, alarms that the robot should generate in response to certain events, obstacles that the robot should avoid, and the like.

In some embodiments, the HTN planner 110 may also receive feedback from a competency checker 140 which evaluates whether the robot successfully performed a given sub-task or whether the robot failed a sub-task. The competency checker 140 may receive the configuration files 120 from the HTN planner 110 and also the simulation results from the simulation application 130. The competency checker 140 may detect a sub-task to be performed from the configuration files 120, and whether the robot passed the test from the simulation results. The HTN planner 110 may generate additional configuration files 120 based on the simulation results of the robot by the simulation application 130 during a previous simulation corresponding to a previous configuration file 120.

The competency checker 140 may help provide a closed-loop control. For example, if a robot is having difficulty with a particular lesson, more lessons can be applied to illustrate the concept the robot is having problems with. This can be used either to improve the ML training regimen, or to tease out where the particular failure is. For instance, if a robot always takes a wide right turn, the robot might have one or more various problems such as a perception problem (in which the robot does not realize the turns are wide), a control problem (in which the robot wants to take a precision turn but is providing the incorrect control signal), a recognition problem (the robot doesn't realize a tight turn is important), and the like. The system can generate scenarios to help distinguish between these issues and once identified either go back to the engineer with a report or generate scenarios particular to that kind of failure (e.g. additional practice in identifying the precision of a turn).

FIG. 2 illustrates a process 200 of generating a configuration file 220 for use in configuring a robotic simulator in accordance with an example embodiment. Referring to the example of FIG. 2, an HTN planner 210 may receive a domain description 212, constraints 214, a robot description 216, and/or competency feedback 218 from the robotic simulator. For example, the domain description 212 may include information about an environment where the robot is to be tested such as a plant, a field, a tunnel, an ocean, or the like. The domain description 212 may specify dimensions of the environment, materials in the environment, and the like. The constraints 214 may include issues that a user submits such as particular errors, obstacles, safety issues, requirements, or the like, that the robot should be trained on. The competency feedback 216 may include a description of the simulation results such as whether the robot passed the test or failed the test, an amount of time it took the robot, and the like.

The HTN planner 210 may generate the configuration file 220 in a format that can be consumed by the robotic simulator. For example, the configuration file 220 may include code for interacting with the robot. The configuration file 220 may include or be executed based on a software driver that enables the code to interact with the robot. In the example of FIG. 2, the configuration file 220 may include attributes such as a scenario to be performed by the robot, a start location within the simulation environment, a finish location within the simulation environment, one or more obstacles for the robot to encounter during the simulation, physical parameters of the robot (size, faults, condition, etc.), time constraints on the simulation to be performed, and the like. For example, the scenario may specify the scenario that the robot should be evaluated in. The obstacles may include physical obstacles in the environment, obstacles resulting from changes to the robot, or the like. For example, the robot may normally have two manipulators for picking up objects, but now one cannot be opened or closed, so it can only use it as a "thumb" on an arm to help manipulate putting an object into its functional hand.

The start location may include a position within the simulation environment where the robot starts the test/training. The end location may include a position within the simulation environment where the robot is attempting to get to during the simulation. It should be appreciated the configuration file 220 may include any number of additional details not shown herein, but that are known in the art.

FIGS. 3A-3D illustrate configurations of a simulation environment based on configuration files generated by an HTN planner. In these examples, the simulation environment includes a sequence of four simulation environments 300A, 300B, 300C, and 300D, which are used for simulation in sequence by the robot. Here, each simulation environment incrementally and sequentially increases in difficulty. In other words, the HTN planner may generate configuration files in sequence where each configuration file includes an additional degree of difficulty. As a result, the robot can learn a task in an incremental, hierarchical manner.

There may be multiple benefits and/or reasons for sequentially increasing the difficultly. For example, the sequential difficulty may create curricular learning. Here, the robot is introduced to simpler situations first to help reduce the perplexity for learning more complex situations later, rather than starting the robot with something complex (e.g., learn addition before calculus, etc.) Another benefit is that it helps a human-led testing regimen. For example, as situations become more complex there are more possible situations. This allows the tester to be sure that the robot is able to perform simple tasks before jumping to more difficult tasks.

Figure 3A:
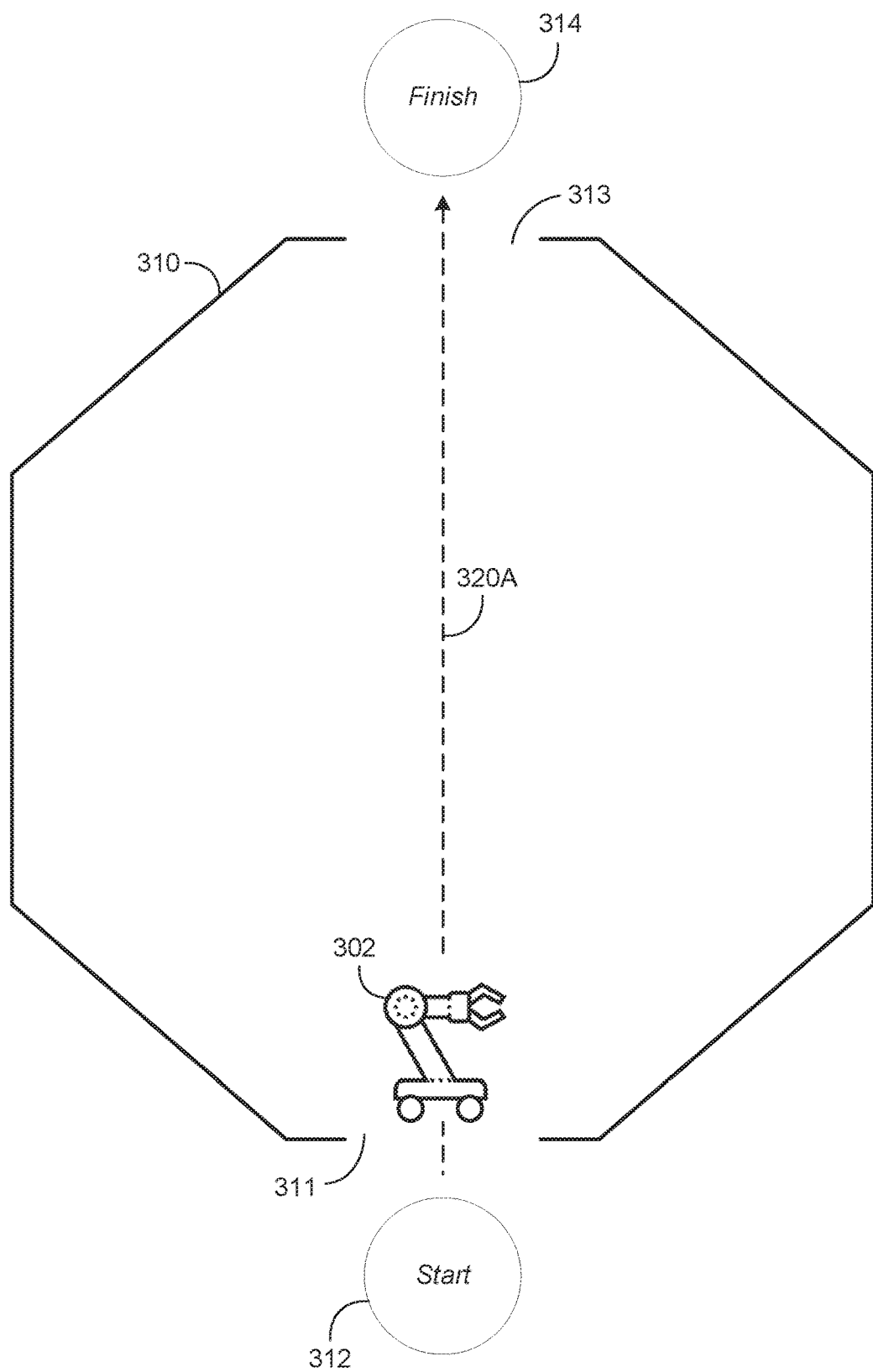
FIGS. 3A-3D are diagrams illustrating differently configured training simulations in accordance with example embodiments.

Referring to FIG. 3A, a simulation environment 300A includes a room having a boundary 310 that represents the dimensions of the room. The simulation environment 300A is generated based on a first configuration file. The simulation environment 300A further includes a door 311 into the room and a door 313 out of the room. The simulation environment 300A further includes a start point 312 and an end point 314. A position of a robot 302 in the virtual environment is shown. Here, the robot 302 is given the task of travelling from the start point 312 to the end point 314 within the virtual world of the simulation environment 300A. In this example, the robot learns a path 320A between the start point 312 and the end point 314. Here, the simulation may appear like a 3D virtual world to the robot 302.

Figure 3B:
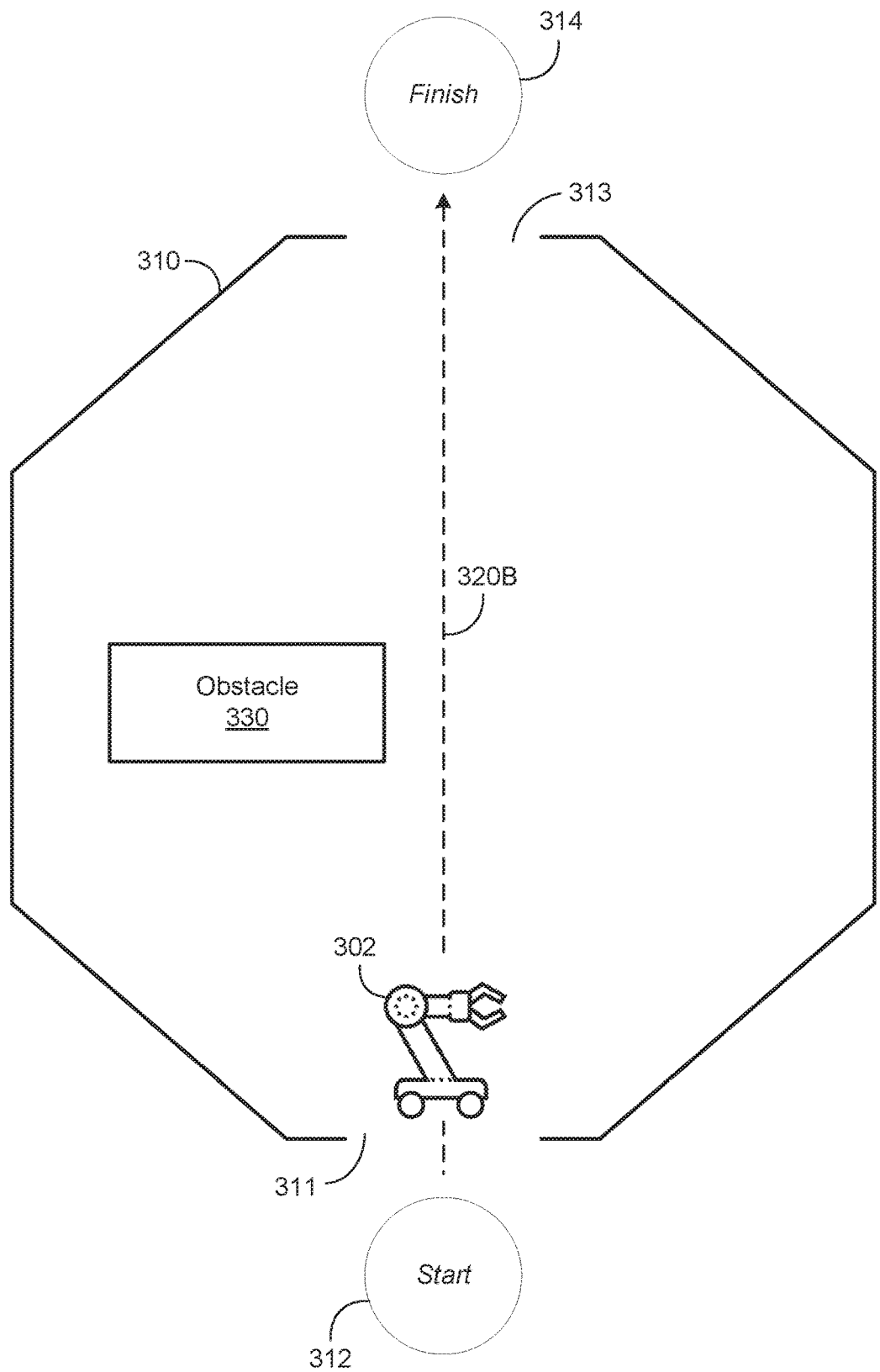

Referring to FIG. 3B, the simulation environment 300B includes the same room having the boundary 310 as shown in the example of FIG. 3A. However, in this example, an obstacle 330 has been added into the simulation environment 300B that is not included in the simulation environment 300A. The simulation environment 300B is generated based on a second configuration file. In this example, the robot 302 detects the obstacle 330 and learns the path 320B between the start point 312 and the end point 314. Here, the difficulty is greater than the difficulty of the simulation environment 300A because the obstacle 330 is present.

Figure 3C:
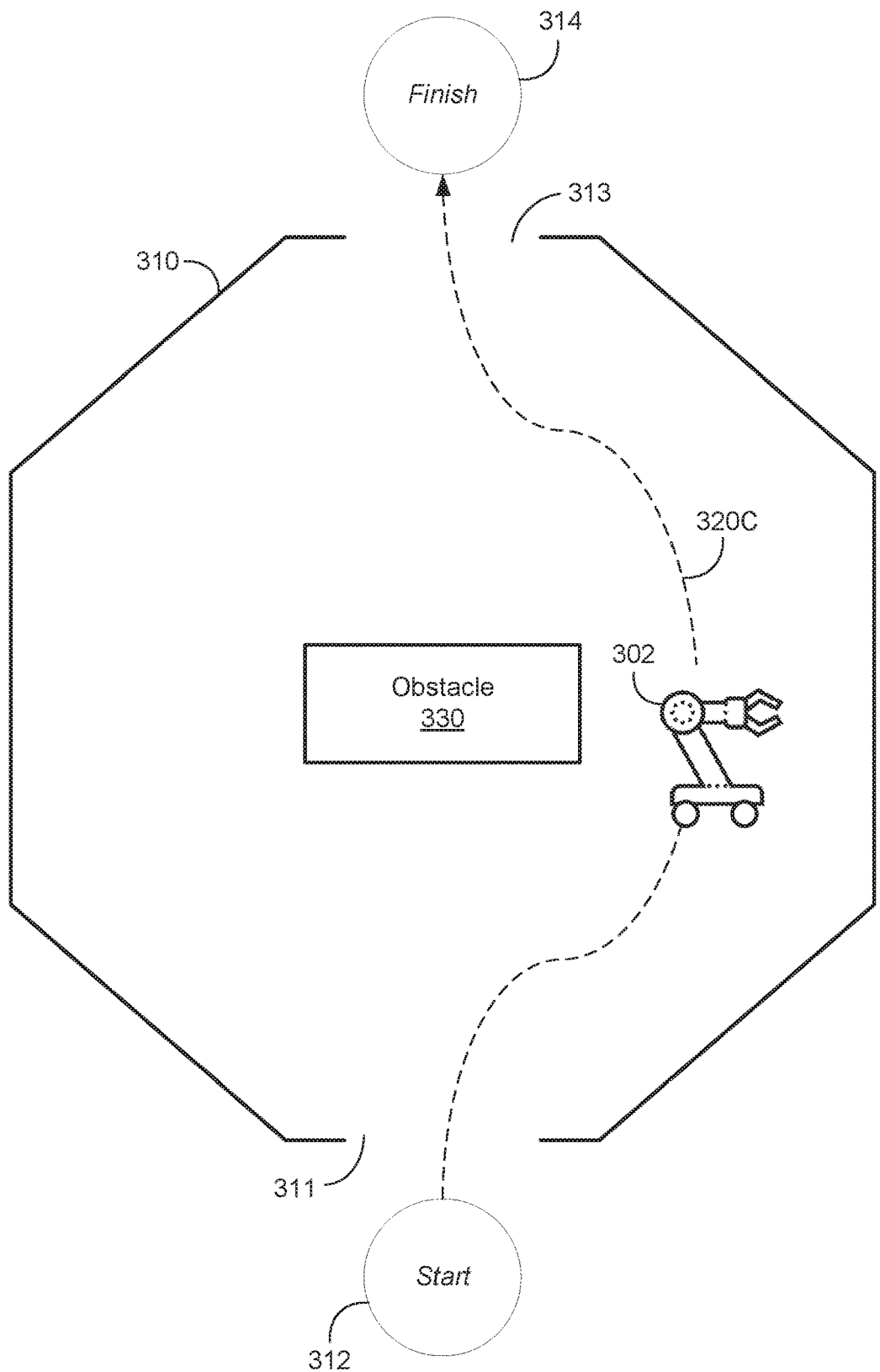

Referring to FIG. 3C, the simulation environment 300C includes the same room having the boundary 310 as shown in the examples of FIGS. 3A and 3B. However, in this example, the obstacle 330 is now positioned in between the start point 312 and the end point 314 of the robot's task. In this example, the robot detects the obstacle 330 in the way, and learns a new path 320C around the obstacle 330. Here, the difficulty is greater than the difficulty of the simulation environment 300B because the obstacle 330 is in the way.

Figure 3D:
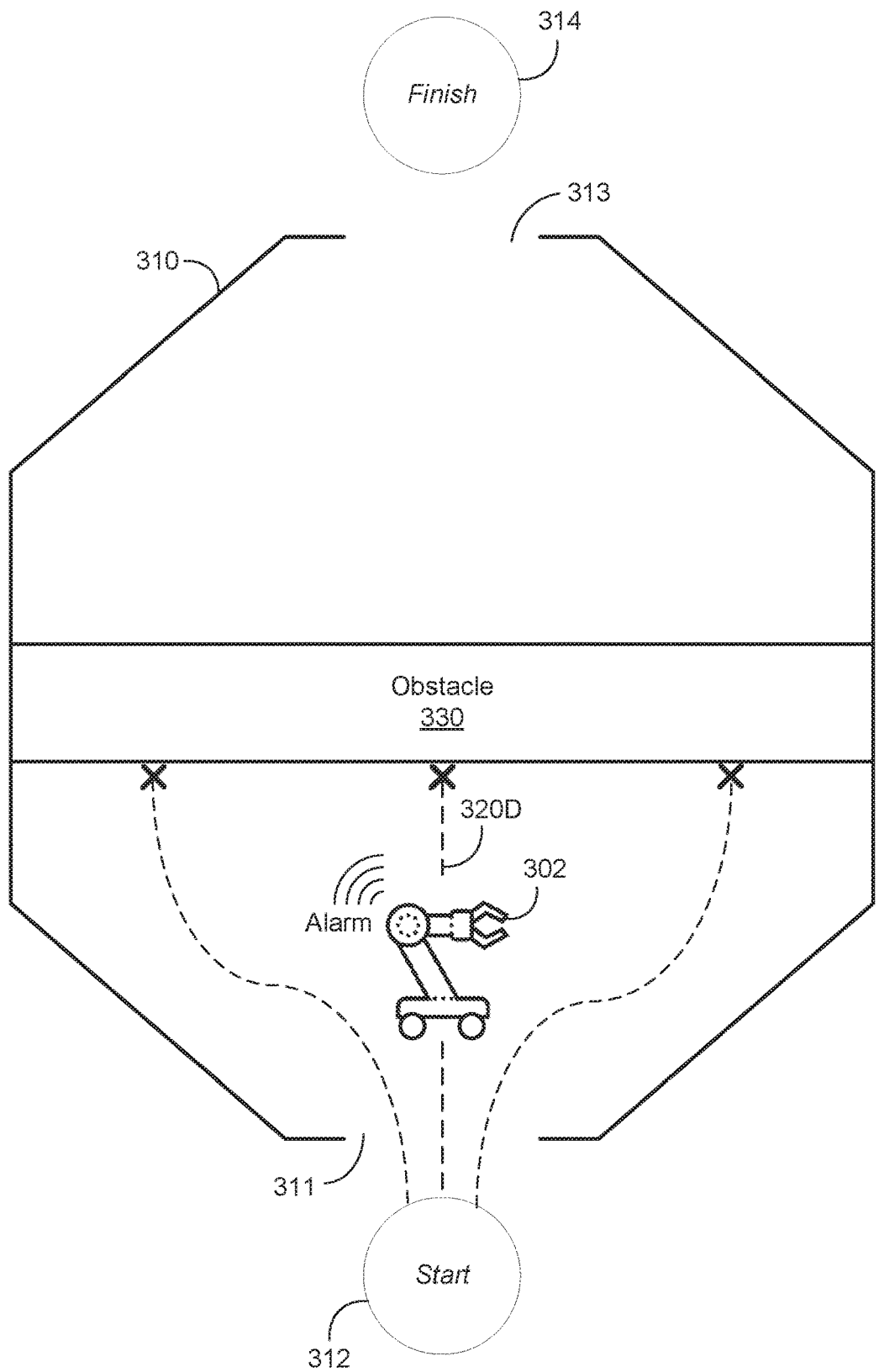

Referring to FIG. 3D, the simulation environment 300D includes the same room having the boundary 310 as shown in the examples of FIGS. 3A-3C. However, in this example, the obstacle is positioned such that it blocks all of the robot's paths from the start point 312 to the end point 314. Here, the robot 302 learns that it cannot get around the obstacle 330 in this scenario, and generates an alarm.

Figure 4A:
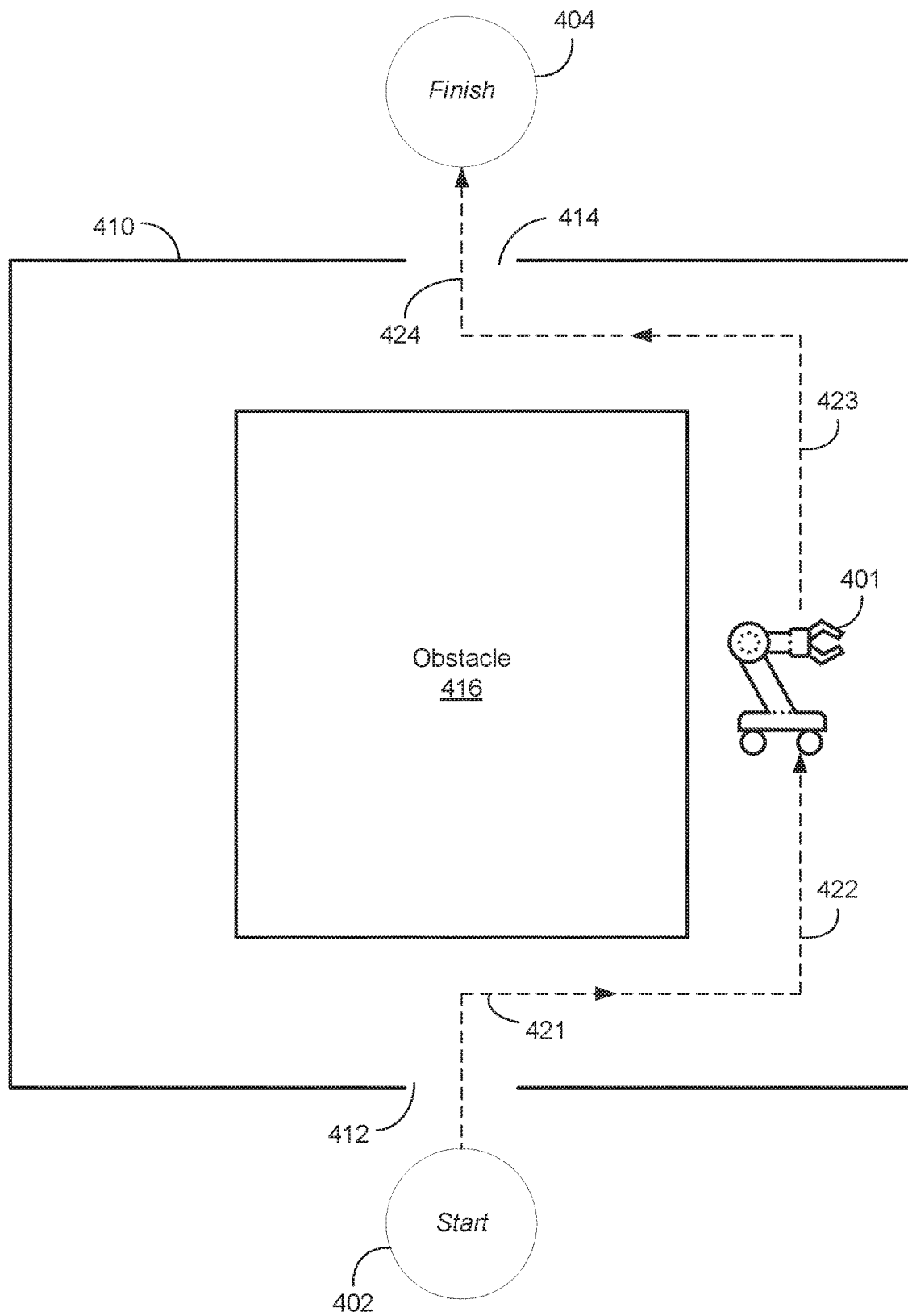
FIGS. 4A-4B are diagrams illustrating sub-activities being generated and performed in accordance with example embodiments.

FIG. 4A illustrates a plurality of sub-activities (sub-tasks) that are identified within a training activity in accordance with example embodiments. Referring to FIG. 4A, a robot 401 may train within a simulation environment such as a robotic simulator. In this example, the training may be performed based on a machine learning algorithm. For example, the machine learning algorithm may be used to train the robot 401 to move from a start point 402 to an end point 404 within a simulated room 410 that has an outer boundary around an obstacle 416. Here, the obstacle 416 may represent a large block or object that is blocking the robot 401 field of view. The training results in the robot learning to move through an doorway 412 along a first path 421, move around an outside of the obstacle 416 along a second path 422, move back around the obstacle to a middle of the room 410 on a third path 423, and move out of an exit door 414 of the room 410 on a fourth path 424. The robot's trip from the start point 402 to the end point 404 is an activity that the robot learns as a result of the machine learning algorithm.

According to various embodiments, the activity can be decomposed into a plurality of sub-activities by the host system described herein. As further described in the example of FIGS. 5A-5B, a trace or other log can be generated as the robot trains within a simulated environment provided by a robotic simulator. The trace can capture the robot's position, speed, direction, change of direction, distance traveled, acceleration, etc., as the robot moves within the simulated environment while performing the activity. The host system may partition the activity into a plurality of sub-activities that are performed in sequence by the robot 401. In this example, each of the paths 421, 422, 423, and 424, may represent a separate sub-activity.

In this example, the host system may identify a change in complexity of the robot's actions during the simulation and label each change in complexity as a learned sub-activity. For example, in the first path 421, the robot encounters the obstacle 416. When doing so, the robot stops moving forward and takes a turn to the right, thus creating a change in complexity of the robot's actions and the path. This action can be labeled as a first sub-activity. This information can be examined from the trace.

Likewise, the robot approaching the boundary of the room 410 and making a left turn around the obstacle 416 as shown on the second path 422 can be a second change in complexity. This action can be identified as a second sub-activity. Furthermore, the robot approaching the top of the room 410 and making a right turn can be a third change in complexity as denoted by the third path 423. Furthermore, the robot encountering the exit door 414 and making a right turn as denoted by the fourth path 424 can be labeled as the fourth sub-activity. Each sub-activity 421, 422, 423, and 424 can be stored in an independently executable file that can be used by the robot in future training and live activities.

Figure 4B:
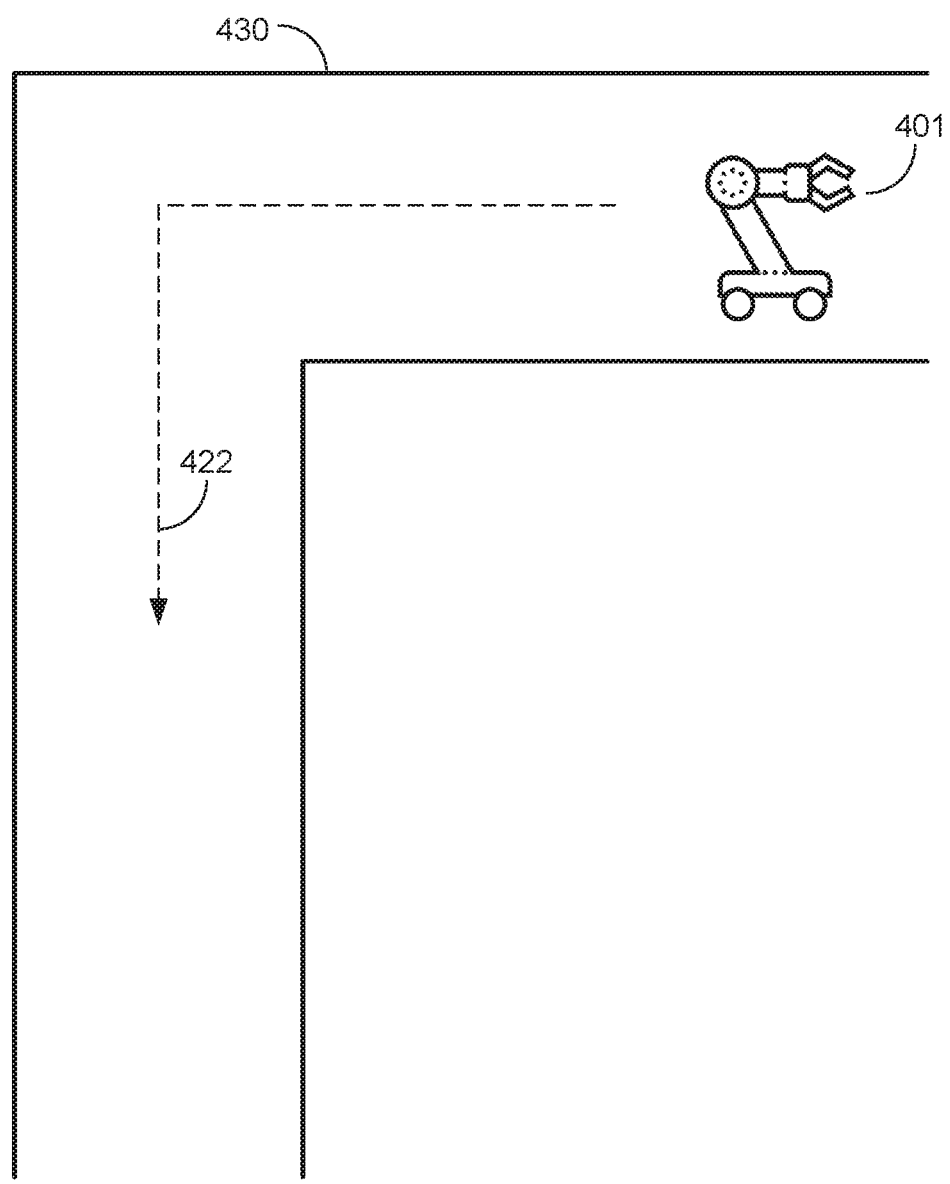

FIG. 4B illustrates a process 400B of the robot 401 using a sub-activity 423 in live operation in accordance with example embodiments. In this example, the robot 401 detects the situation that the robot is currently in. Here, the robot 401 is within a room 430 that involves a hallway ending and turning to the left. In this example, the robot 401 may include a matcher or other component, which can match attributes of the current situation to a library of sub-activities that are previously stored on the robot 401. For example, each sub-activity may be labeled with a description that can be used by the matcher to match the current situation with an activity to be performed by the robot 401. Below is an example of a table that may be included within a library or catalog stored on the robot. In this example, the table includes labels of robot sub-activities learned by the robot during the training of FIG. 4A.

TABLE 1

| Sub-Activity | Label | Program Code |
| --- | --- | --- |
| A-1 | Right Turn around Obstacle | Code 1 |
| A-2 | Left Turn at End of Room | Code 2 |
| A-3 | Right Turn to Exit | Code 3 |

As shown above in Table 1, each of the paths 421, 422, and 424, corresponds to sub-activities A-1, A-2, and A-3, respectively, of a larger activity A. Since sub-activity 422 and 423 are the same, the system may remove the duplicate sub-activities from storage and use only one of the sub-activities for future matching, however, embodiments are not limited thereto.

In the example of FIG. 4B, the current situation includes the attributes of room ending and left turn needed. The matcher may match the attributes of the current situation with a label of sub-activity, which may include the label "Left Turn at End of Room" that corresponds to A-2 in Table 1 and path 422 in FIG. 4A. Here, the matcher may trigger the robot to execute Code 2 corresponding to the matched sub-activity A-2 thereby enabling the robot 401 to successfully navigate the left turn with the room 430. Thus, the robot can use only a part of the activity A that is learned by the robot during the training in FIG. 4A. By partitioning the activity A into smaller sub-tasks, a granularity of robot activities can be reduced thereby improving the opportunity to use previously learned behaviors on other/different situations.

Figure 5A:
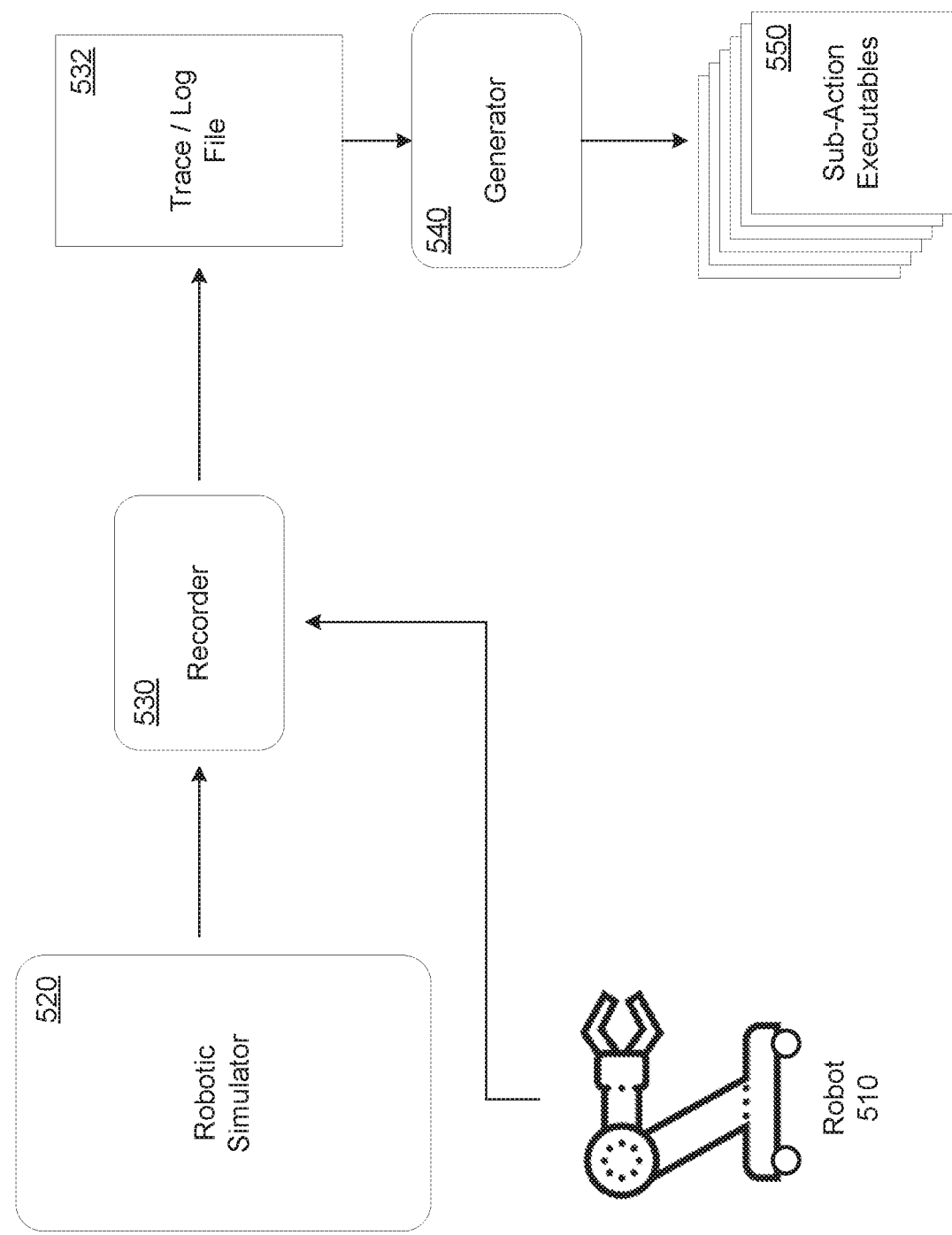
FIG. 5A is a diagram illustrating a process of generating programs for executing sub-activities of a robot in accordance with an example embodiment.

FIG. 5A illustrates a process 500A of generating programs for executing sub-activities of a robot 510 in accordance with an example embodiment. Referring to FIG. 5A, a robot may learn various activities within a robotic simulator 520 application. Here, the robot 510 may be trained based on various machine learning algorithms which train the robot 510 to perform specific activities. Each activity may receive a corresponding policy (executable program) that can subsequently be executed by the robot 510 when interacting in a common scenario in the real world. In this example, the system decomposes the activity learned by the robot 510 into a plurality of sub-activities based on complexity of the behavior/activity of the robot 510 during the simulated environment provided by the robotic simulator 520.

In this example, actions, behaviors, tasks, etc., performed by the robot 510 may create simulation data such as speed, distance traveled, acceleration, direction, changes in direction, turns, operation of various elements of the robot 510 (e.g., arm, bed, motor, computer vision, etc.), and the like. The simulation data may be recorded by a recorder 530 within a trace file 532. The trace file 532 may be stored in a memory of the system and accessed by the generator 540 which can parse the data within the trace file 532 to identify complexity information. For example, the generator 540 may detect a change in speed, a change in direction, an actuation of an element of the robot 510, a change in speed, a distance traveled, or the like, that corresponds to a predefined complexity. In this case, the generator 540 can identify such a change as a sub-activity.

The predefined complexity may be identified by predefined attributes that are stored by the generator 540. Examples of predefined attributes include when a change of direction occurs, when a change in speed falls below a certain speed, when a particular element of the robot is activated or used, when multiple turns occur in a predefined period of time (representing an obstacle being encountered) and the like. The generator 540 may be programmed to identify when one or more of these predefined attributes occur within the simulation data. When the generator 540 identifies such a predefined attribute or combination of predefined attributes, the generator 540 may determine a sub-activity has occurred. In some embodiments, the generator 540 may break up a single activity into a plurality of sequential sub-activities that occur in sequence of time.

The generator 540 may store each sub-activity in a separate executable file 550 which can be subsequently used to execute the sub-activity when the robot is in live mode. Furthermore, the generator 540 may generate labels for each of the sub-activities which can be used to match the sub-activity at a later time. The labels may include descriptive text that provides a short summary of the sub-activity, the environment (room description), and the like. As an example, when the room is shaped like a square, and the robot encounters a left turn around an obstacle, the robot should perform this task, etc.

Figure 5B:
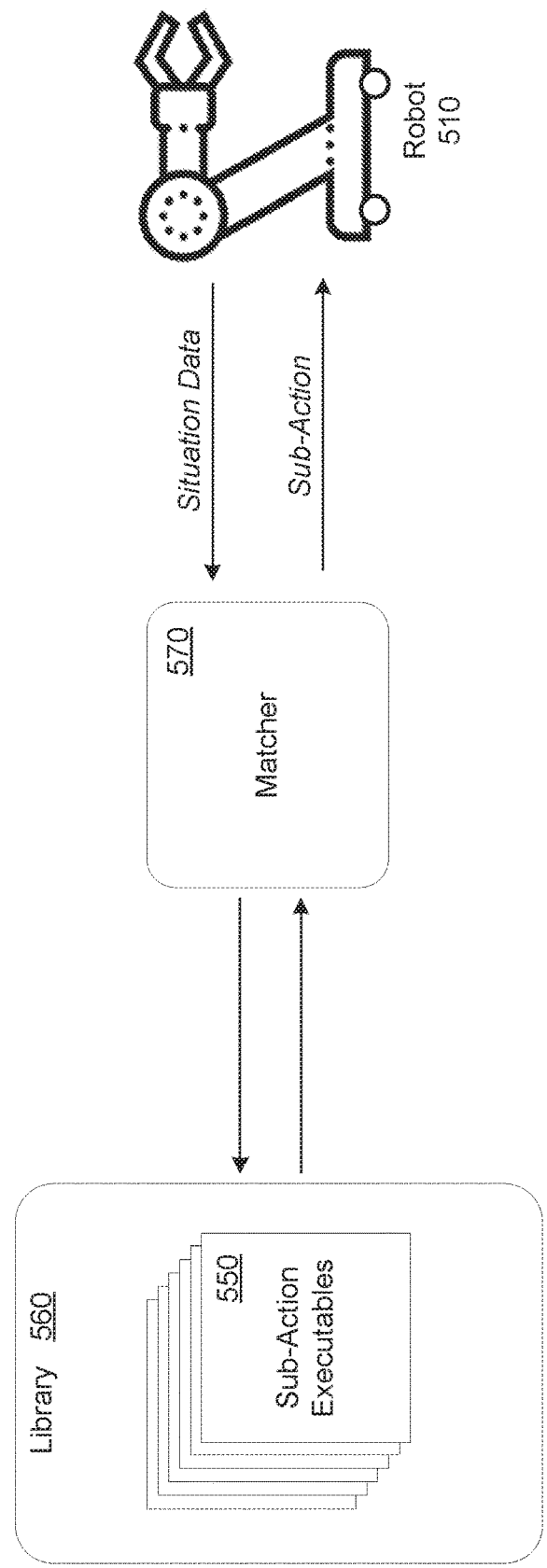
FIG. 5B is a diagram illustrating a process of matching a situation of a rob robot to a sub-activity in accordance with an example embodiment.

FIG. 5B illustrates a process 500B of matching a situation of a robot to a previously stored sub-activity and triggering execution of the matched sub-activity on the robot, in accordance with an example embodiment. Referring to FIG. 5B, a matcher 570 may receive data associated with a current environment of the robot 510. For example, the current environment may include a description of the domain of the robot such as a plant floor, a hallway, a control room, an outdoor environment, a bridge, etc. The current environment data may also include additional information such as obstacle in the road, doorway location, size of room, shape of room, shape of obstacle, and the like. The matcher 570 may receive the data from the robot 510 and match the situation of the robot 510 to a sub-activity previously stored in a library 560 of sub-activities. Here, the library may be stored on the robot 510 along with the matcher 570. As another example, the library 560 and/or the matcher 570 may be stored on a separate device that connects to the robot 510 physically or wirelessly. The matcher 570 may provide the matched sub-activity file to the robot 510 for execution.

Figure 6A:
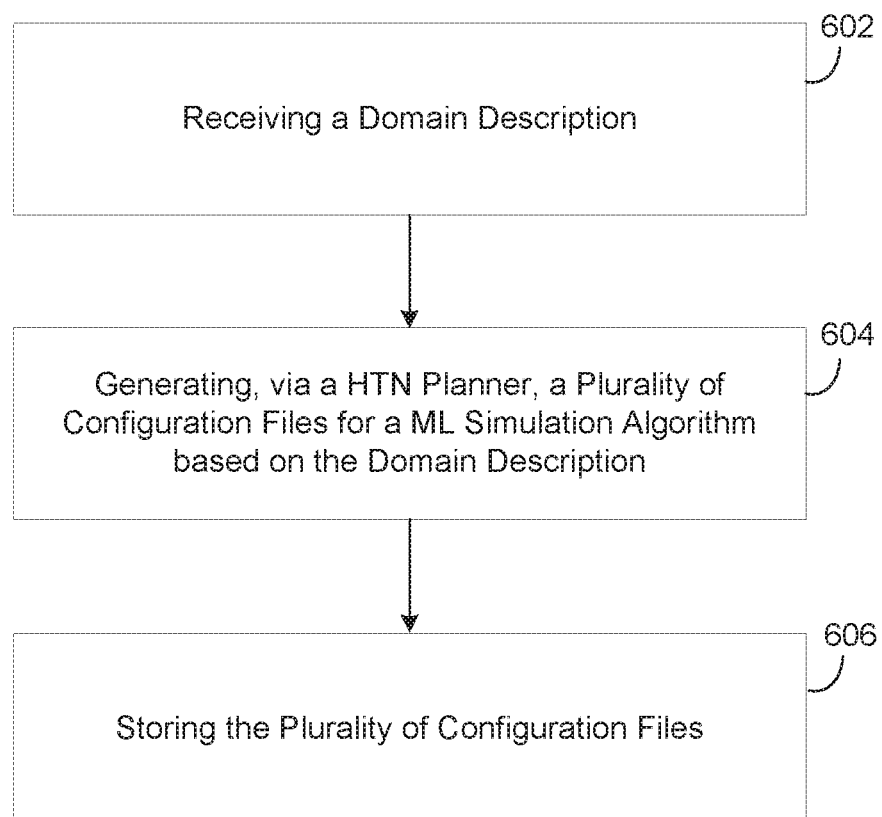
FIG. 6A is a diagram illustrating a method of generating configuration files for robotic simulation in accordance with an example embodiment.

FIG. 6A illustrates a method 600 of generating configuration files for robotic simulation in accordance with an example embodiment. For example, the method 600 may be performed by a service, an application, a program, or the like, which is executing on a host platform such as a database node, a cloud platform, a web server, an on-premises server, another type of computing system, or a combination of devices/nodes. In some embodiments, the method 600 may be performed by an HTN planner, but embodiments are not limited thereto. Referring to FIG. 6, in 610, the method may include receiving a domain description which comprises information about an operating environment of a robot. The domain description may include primitive information of the robot's environment such as location (e.g., power plant, automotive plant, outdoor field, underwater, etc.), as well as other details such as size, shape, and other surrounding objects. In some embodiments, the method may further include receiving additional data such as a robot description, user-defined constraints, and the like.

In 620, the method may include generating, via an automated planner (such as a HTN planner, etc.), a plurality configuration files for a machine learning simulation algorithm for training the robot based on the domain description, where each configuration file comprises different configurations of a simulation environment. Furthermore, in 630, the method may include storing the plurality of configuration files in a storage device. According to various embodiments, the plurality of configuration files configure a simulator for training the robot based on the machine learning simulation algorithm. In some embodiments, the method may further include transmitting the plurality of configuration files to a robot simulator software application.

In some embodiments, the method may further include receiving a predetermined user criteria for the simulation environment, and the generating may further include generating the plurality of configuration files based on the predetermined user criteria. Here, the user criteria may include specific issues to test for (e.g., obstacle in the way, timing constraints, damaged part, safety regulations, etc.) In this example, the generating may include generating the plurality of configuration files such that at least a predetermined number of configuration files include an issue associated with the predetermined user criteria on a path of the robot.

In some embodiments, each configuration file comprises at least one of a start point for the robot, an end point for the robot, a task to be performed by the robot, and an obstacle within the simulation environment. In some embodiments, the generating may further include adding a common task within each of the plurality of configuration files. In some embodiments, the generating may further include sequentially (e.g., hierarchically) increasing a difficulty of the common task in a sequence of configuration files from the plurality of configuration files. In some embodiments, the generating may further include reading configuration attributes for the plurality of configuration files from a software library of the HTN planner.

Figure 6B:
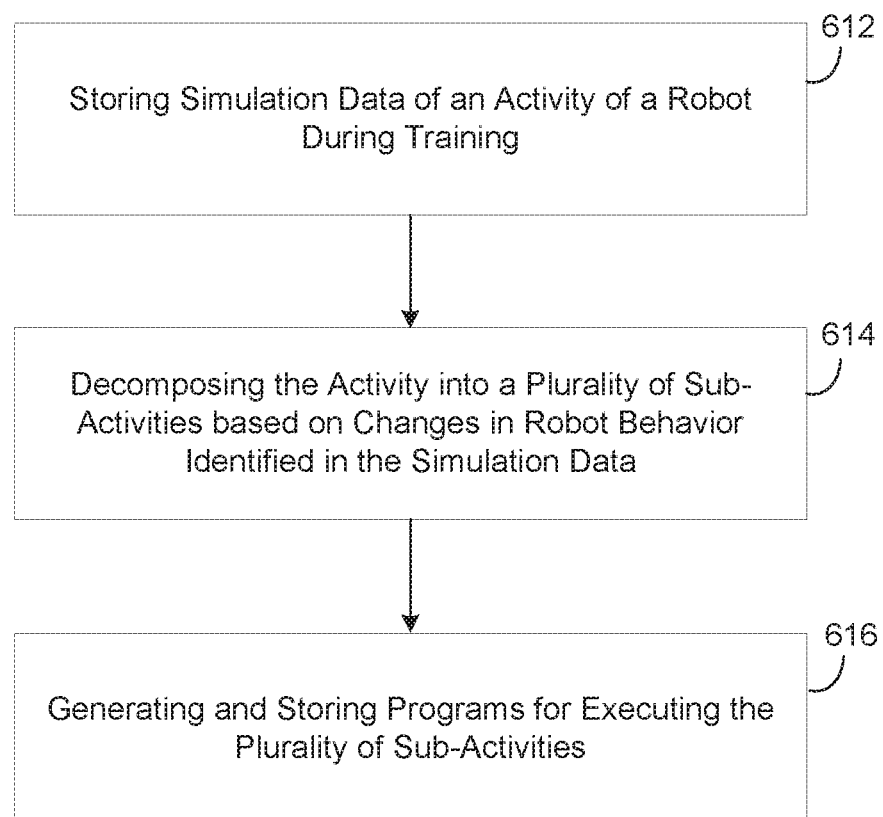
FIG. 6B is a diagram illustrating a method of decomposing a robot activity into sub-activities in accordance with an example embodiment.

FIG. 6B illustrates a method 610 of decomposing a robot activity into sub-activities in accordance with an example embodiment. For example, the method 610 may be performed by a host system as described herein. Referring to FIG. 6B, in 612, the method may include receiving and/or storing simulation data comprising an activity of a robot during a training simulation performed via a robotic simulator. For example, the simulation data may include a trace or other description of an activity performed by the robot during a simulated training exercise. The simulation data may include a table, a spreadsheet, a text-based description, or the like, which includes various parameter such as robot speed, direction, timing information, distance traveled, domain information, robot goals, and the like.

In 614, the method may include decomposing the activity into a plurality of sub-activities that are performed by the robot during the training simulation based on changes in behavior of the robot identified within the simulation data. For example, the decomposing may include decomposing the activity performed by the robot into the plurality of sub-activities performed by the robot based on changes in complexity of the activity within the simulation data. Changes in complexity may be changes in one of speed, direction, distance, timing, and/or the like, and may be detected based on the trace of the robot captured during the robot simulation. In 616, the method may include generating and storing a plurality of programs for executing the plurality of sub-activities, respectively, in a storage. For example, the programs may be individually executable programs that are generated by the system such that each sub-activity can be executed separately from the others by the robot. Thus, the sub-activities can be individually applied to different situations which don't include the entire activity of the robot performed during the training simulation.

In some embodiments, the method may further include labeling each program from among the plurality of different programs with an identifier of a corresponding sub-activity from among the plurality of sub-activities, and storing the labeled programs in a storage of the robot. In some embodiments, the decomposing may include partitioning the activity performed by the robot into a plurality of sequential sub-activities that are performed in sequence by the robot. In some embodiments, the decomposing may include identifying a sub-activity performed by the robot based on a change in at least one of direction of travel and speed of travel of the robot during the training simulation. In some embodiments, the decomposing may include identifying a sub-activity performed by the robot based on obstacle encountered by the robot during the training simulation. In some embodiments, the simulation data may include an activity that is learned by the robot via repeated execution of a machine learning model.

Figure 7:
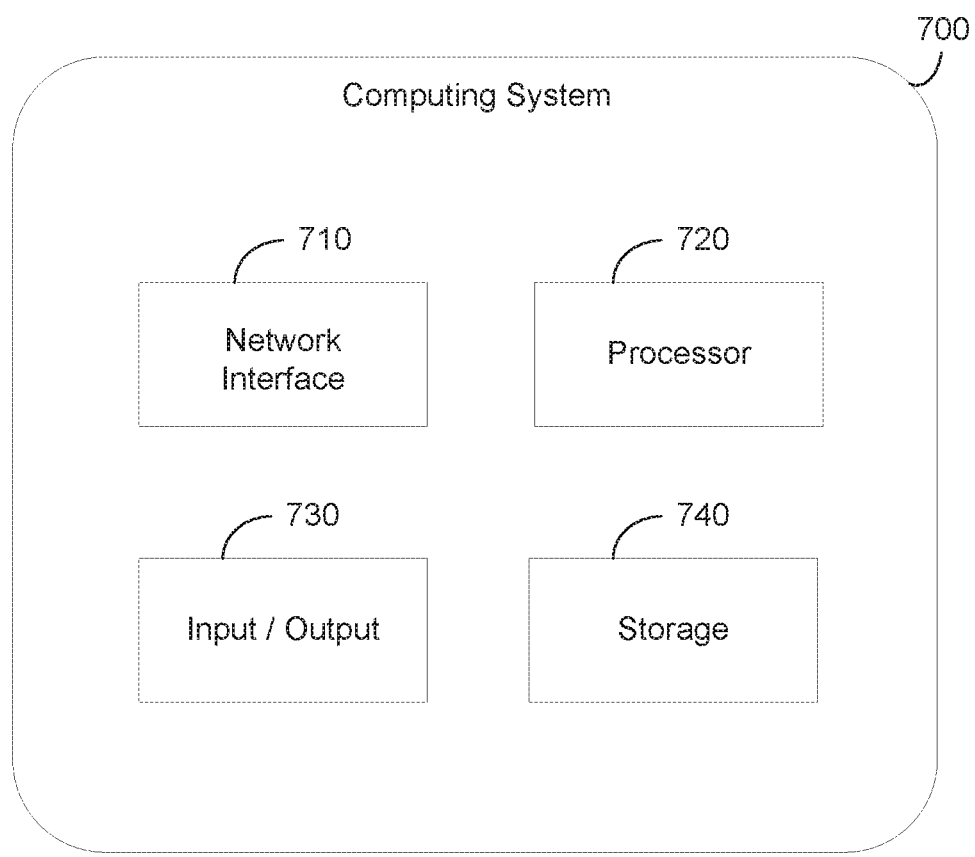
FIG. 7 is a diagram illustrating a computing system for use in the examples herein in accordance with an example embodiment.

FIG. 7 illustrates a computing system 700 that may be used in any of the methods and processes described herein, in accordance with an example embodiment. For example, the computing system 700 may be a database node, a server, a cloud platform, a user device, or the like. In some embodiments, the computing system 700 may be distributed across multiple computing devices such as multiple database nodes. Referring to FIG. 7, the computing system 700 includes a network interface 710, a processor 720, an input/output 730, and a storage device 740 such as an in-memory storage, and the like. Although not shown in FIG. 7, the computing system 700 may also include or be electronically connected to other components such as a display, an input unit(s), a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or reconfigurable. The input/output 730 may include an interface, a port, a cable, a bus, a board, a wire, and the like, for inputting and outputting data to and from the computing system 700. For example, data may be output to an embedded display of the computing system 700, an externally connected display, a display connected to the cloud, another device, and the like. The network interface 710, the input/output 730, the storage 740, or a combination thereof, may interact with applications executing on other devices.

The storage device 740 is not limited to a particular storage device and may include any known memory device such as RAM, ROM, hard disk, and the like, and may or may not be included within a database system, a cloud environment, a web server, or the like. The storage 740 may store software modules or other instructions which can be executed by the processor 720 to perform the method shown in FIGS. 6A-6B. According to various embodiments, the storage 740 may include a data store having a plurality of tables, partitions and sub-partitions. The storage 740 may be used to store database objects, records, items, entries, and the like, associated with workflow/process analysis and optimization.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage configured to store a configuration file that comprises executable code which causes a robot to simulate an activity; and
a processor configured to
execute the executable code via a robotic simulator to perform a simulation of the activity via a virtual robot corresponding to the robot,
record a trace file of simulated behavior of the virtual robot during the simulation,
decompose the activity into a plurality of sub-activities based on changes in behavior of the virtual robot identified from the simulated behavior stored in the trace file, and
generate and store a plurality of programs for executing the plurality of sub-activities, respectively, in the storage.

2. The computing system of claim 1, wherein the processor is further configured to upload a library that includes the plurality of programs for executing the plurality of sub-activities from the robotic simulator to a memory of the robot.

3. The computing system of claim 1, wherein the processor is configured to decompose the activity performed by the robot into the plurality of sub-activities performed by the robot based on changes in complexity of the activity identified from the simulated behavior stored in the trace file.

4. The computing system of claim 1, wherein the processor is further configured to generate the trace file by performing a trace of actions performed by the robot during the simulation.

5. The computing system of claim 1, wherein the processor is further configured to label each program from among the plurality of different programs with an identifier of a corresponding sub-activity from among the plurality of sub-activities, and store the labeled programs in a memory of the robot.

6. The computing system of claim 1, wherein the processor is configured to partition the activity performed by the robot into a plurality of sequential sub-activities that are performed in sequence by the robot.

7. The computing system of claim 1, wherein the processor is configured to identify a sub-activity performed by the robot based on a change in at least one of direction of travel and speed of travel of the robot identified from the simulated behavior stored in the trace file.

8. The computing system of claim 1, wherein the processor is configured to identify a sub-activity performed by the robot based on obstacle encountered by the robot during the simulation which is identified based on the simulated behavior stored in the trace file.

9. A method comprising:
storing a configuration file comprises executable code which causes a robot to simulate an activity via a robotic simulator;
executing the executable code via the robotic simulator to perform a simulation of the activity via a virtual robot corresponding to the robot;
recording a trace file of simulated behavior of the virtual robot during the simulation;
decomposing the activity into a plurality of sub-activities based on changes in behavior of the virtual robot identified from the simulated behavior stored in the trace file; and
generating and storing a plurality of programs for executing the plurality of sub-activities, respectively, in a storage of the robot.

10. The method of claim 9, further comprising uploading a library that includes the plurality of programs for executing the plurality of sub-activities from the robotic simulator to a memory of the robot.

11. The method of claim 9, wherein the decomposing comprises dividing the activity performed by the robot into the plurality of sub-activities performed by the robot based on changes in complexity of the activity identified from the simulated behavior stored in the trace file.

12. The method of claim 9, further comprising generating the trace file by performing a trace of actions performed by the robot during the simulation.

13. The method of claim 9, further comprising labeling each program from among the plurality of different programs with an identifier of a corresponding sub-activity from among the plurality of sub-activities, and storing the labeled programs in a memory of the robot.

14. The method of claim 9, wherein the decomposing comprises partitioning the activity performed by the robot into a plurality of sequential sub-activities that are performed in sequence by the robot.

15. The method of claim 9, further comprising identifying a sub-activity performed by the robot based on a change in at least one of direction of travel and speed of travel of the robot identified from the simulated behavior stored in the trace file.

16. The method of claim 9, further comprising identifying a sub-activity performed by the robot based on obstacle encountered by the robot during the simulation which is identified from the simulated behavior stored in the trace file.

17. A non-transitory computer-readable medium comprising instructions which when executed by a processor cause a computer to perform a method comprising:
- storing a configuration file comprises executable code which causes a robot to simulate an activity via a robotic simulator;
- executing the executable code via the robotic simulator to perform a simulation of the activity via a virtual robot corresponding to the robot;
- recording a trace file of simulated behavior of the virtual robot during the simulation;
- decomposing the activity into a plurality of sub-activities based on changes in behavior of the virtual robot identified from the simulated behavior stored in the trace file; and
- generating and storing a plurality of programs for executing the plurality of sub-activities, respectively, in a storage of the robot.

18. The non-transitory computer-readable medium of claim 17, wherein the method further comprises uploading a library that includes the plurality of programs for executing the plurality of sub-activities from the robotic simulator to a memory of the robot.

19. The non-transitory computer-readable medium of claim 17, wherein the decomposing comprises dividing the activity performed by the robot into the plurality of sub-activities performed by the robot based on changes in complexity of the activity identified from the simulated behavior stored in the trace file.

20. The non-transitory computer-readable medium of claim 17, wherein the method further comprises generating the trace file by performing a trace of actions performed by the robot during the simulation.

* * * * *